United States Patent
Clifton et al.

(10) Patent No.: US 9,749,869 B2
(45) Date of Patent: *Aug. 29, 2017

(54) METHOD OF INTERFERENCE AVOIDANCE AND BASE STATION

(71) Applicants: SONY CORPORATION, Tokyo (JP); SONY EUROPE LIMITED, Weybridge (GB)

(72) Inventors: John Christopher Clifton, Hampshire (GB); John Nicholas Wilson, Hampshire (GB)

(73) Assignees: SONY CORPORATION, Tokyo (JP); SONY EUROPE LIMITED, Weybridge (GB)

( * ) Notice: Subject to any disclaimer, the term of this patent is extended or adjusted under 35 U.S.C. 154(b) by 147 days.

This patent is subject to a terminal disclaimer.

(21) Appl. No.: 14/883,035

(22) Filed: Oct. 14, 2015

(65) Prior Publication Data

US 2016/0037351 A1    Feb. 4, 2016

Related U.S. Application Data

(63) Continuation of application No. 13/638,824, filed as application No. PCT/GB2011/050551 on Mar. 18, 2011, now Pat. No. 9,215,720.

(30) Foreign Application Priority Data

Mar. 31, 2010    (GB) .................................... 1005425.2

(51) Int. Cl.
*H04W 72/00* (2009.01)
*H04W 16/12* (2009.01)
(Continued)

(52) U.S. Cl.
CPC ........... *H04W 16/12* (2013.01); *H04W 4/023* (2013.01); *H04W 16/14* (2013.01); *H04W 72/082* (2013.01); *H04W 72/04* (2013.01)

(58) Field of Classification Search
CPC ..... H03W 16/12; H04W 72/04; H04W 4/023; H04W 72/082; H04W 16/14;
(Continued)

(56) References Cited

U.S. PATENT DOCUMENTS 5,661,528 A    8/1997   Han
5,777,692 A    7/1998   Ghosh
(Continued)

FOREIGN PATENT DOCUMENTS

GB           2483183 A          2/2012
SE    WO 2010027308 A1 *   3/2010    ............ H04W 16/14
(Continued)

OTHER PUBLICATIONS

British Search Report Issued Jul. 26, 2010 in GB1005425.2 Filed Mar. 31, 2010.

(Continued)

*Primary Examiner* — Mahendra Patel
(74) *Attorney, Agent, or Firm* — Oblon, McClelland, Maier & Neustadt, L.L.P.

(57) ABSTRACT

A method of reducing interference to reception of streams of television content received at a television receiver in which each of the streams of television content are transmitted on one of a plurality of frequency channels in accordance with a channel map which defines on which of the plurality of frequency channels each stream of television content is transmitted and the interference being caused by a base station transmitting data to or receiving data from one or more mobile devices via radio communication signals in a vicinity of the television receiver. The method includes (Continued)

identifying the channel map and adapting a transmission of the radio communication signals between the base station and the one or more of mobile devices in accordance with the identified channel map to reduce interference at the television receiver.

18 Claims, 13 Drawing Sheets

(51) Int. Cl.
*H04W 16/14* (2009.01)
*H04W 72/08* (2009.01)
*H04W 4/02* (2009.01)
*H04W 72/04* (2009.01)

(58) Field of Classification Search
CPC ...... H04W 25/00; H04W 48/16; G06Q 30/02; H04N 7/181; H04N 7/17318; H04N 21/2146; H04N 19/115; H04N 19/61; H04N 19/124; H04N 19/136; H04L 41/5022; H04Q 7/20
USPC ........ 455/452.1, 517, 45, 560; 342/457, 387
See application file for complete search history.

(56) References Cited

U.S. PATENT DOCUMENTS

| | | | |
|---|---|---|---|
| 6,727,847 B2 * | 4/2004 | Rabinowitz | G01S 5/145 342/357.29 |
| 6,914,560 B2 * | 7/2005 | Spilker, Jr. | G01S 5/145 342/457 |
| 7,054,562 B1 | 5/2006 | Balakrishnan et al. | |
| 8,554,146 B2 * | 10/2013 | Kermoal | H04W 16/14 455/63.1 |
| 2002/0085124 A1 * | 7/2002 | Doetsch | H04B 1/0007 348/607 |
| 2003/0200547 A1 * | 10/2003 | Frisco | G06Q 30/02 725/77 |
| 2007/0253394 A1 * | 11/2007 | Horiguchi | H04W 16/14 370/338 |
| 2008/0268832 A1 * | 10/2008 | Peng | H04W 16/14 455/424 |
| 2009/0013356 A1 * | 1/2009 | Doerr | H04L 65/4076 725/62 |
| 2009/0061779 A1 * | 3/2009 | Gurney | H04W 16/14 455/63.1 |
| 2009/0197627 A1 | 8/2009 | Kuffner et al. | |
| 2009/0276813 A1 * | 11/2009 | Bleiweiss | H04N 19/115 725/82 |
| 2010/0017835 A1 * | 1/2010 | Wilson | H04H 20/12 725/114 |
| 2010/0020732 A1 | 1/2010 | Gaddam et al. | |
| 2010/0309806 A1 * | 12/2010 | Wu | H04H 20/423 370/252 |
| 2011/0165903 A1 * | 7/2011 | Selen | H04W 16/14 455/509 |

FOREIGN PATENT DOCUMENTS

| | | | |
|---|---|---|---|
| WO | 2007 056020 | 5/2007 | |
| WO | 2008 038209 | 4/2008 | |
| WO | WO 2008038209 A2 * | 4/2008 | .......... H04B 7/2656 |
| WO | 2008 097253 | 8/2008 | |
| WO | 2010 021780 | 2/2010 | |
| WO | 2010 027308 | 3/2010 | |
| WO | WO 2010/117965 A1 | 10/2010 | |
| WO | WO 2010/142021 A1 | 12/2010 | |
| WO | WO 2011/100314 A1 | 8/2011 | |

OTHER PUBLICATIONS

International Search Report Issued Jul. 13, 2011 in PCT/GB11/050551 Filed Mar. 18, 2011.
Office Action issued Mar. 4, 2013 in Great Britain Patent Application No. GB1005425.2.

* cited by examiner

| Band V Channel | Centre (MHz) |
|---|---|
| 39 | 618 |
| 40 | 626 |
| 41 | 634 |
| 42 | 642 |
| 43 | 650 |
| 44 | 658 |
| 45 | 666 |
| 46 | 674 |
| 47 | 682 |
| 48 | 690 |
| 49 | 698 |
| 50 | 706 |
| 51 | 714 |
| 52 | 722 |
| 53 | 730 |
| 54 | 738 |
| 55 | 746 |
| 56 | 754 |
| 57 | 762 |
| 58 | 770 |
| 59 | 778 |
| 60 | 786 |
| 61 | 794 |
| 62 | 802 |
| 63 | 810 |
| 64 | 818 |
| 65 | 826 |
| 66 | 834 |
| 67 | 842 |
| 68 | 850 |

Channels 53–60: At risk
Channels 58–60: Particularly at Risk
Channels 61–68: LTE

FIG. 1

METHOD OF INTERFERENCE AVOIDANCE AND BASE STATION

PRIORITY INFORMATION

This application is a continuation of U.S. Ser. No. 13/638,824, filed Dec. 18, 2012, which claims priority to and is a §371 of international application PCT/GB2011/050551, filed Mar. 18, 2011, which claims priority to Great Britain application 10 05 425.2, filed Mar. 31, 2010. The contents of each priority document are hereby incorporated in their entirety.

TECHNICAL FIELD

The present invention relates to methods of reducing interference at television receivers produced by mobile communication systems transmitting radio communication signals, and networks, systems and mobile communication base stations for reducing such interference.

BACKGROUND OF THE INVENTION

The UHF (Ultra High Frequency) radio band covers a range of frequencies between 300 MHz to 3 GHz. Radio frequencies within the UHF band have particularly useful propagation and information bearing properties therefore many systems which rely on the communication of information using radio waves are designed to transmit and receive information on radio signals using the UHF radio band.

To ensure a fair and organised allocation of the UHF spectrum, regulatory bodies, such as the Office of Communications (OFCOM) in the UK and the Federal Communications Commission (FCC) in the United States, divide the UHF spectrum into different frequency bands and allocate each band to a certain group of users and uses.

As time progresses, it becomes necessary for the regulatory bodies to re-organise the allocation of the UHF spectrum to accommodate new technologies which communicate using the UHF spectrum and to account for the demise of older technologies which no longer justify a reserved section of the spectrum. The task of reallocating bands of the UHF spectrum is not always made purely with technical considerations in mind.

For example, in the UK after 2012, radio transmitters broadcasting terrestrial television signals using the PAL (phase alternating line) analogue transmission mode on the so-called "800 MHz band" will cease transmitting. The "800 MHz band" refers to a range of frequencies between 790 MHz and 862 MHz. These frequencies will be re-allocated by OFCOM for other uses such as so-called "fourth generation" mobile communications services. As a result mobile devices (such as mobile telephones and other portable devices such as laptops, notebooks, camcorders, cameras with built in wireless communications functionality) can be expected to be deployed which transmit and receive radio signals on frequencies within the 800 MHz band. As fourth generation mobile devices become more widespread, this may cause interference problems with devices for receiving television signals such as televisions, personal video recorders (PVRs), set-top boxes and so on.

SUMMARY OF INVENTION

According to an aspect of the present invention there is provided a method of reducing interference to the reception of streams of television content received at a television receiver in which each of the streams of television content are transmitted on one of a plurality of frequency channels in accordance with a channel map which defines on which of the plurality of frequency channels each stream of television content is transmitted and the interference being caused by a base station transmitting data to or receiving data from one or more mobile devices via radio communication signals in a vicinity of the television receiver. The method comprises identifying the channel map and adapting a transmission of the radio communication signals between the base station and the one or more of mobile devices in accordance with the identified channel map to reduce interference at the television receiver.

The reallocation of certain frequency channels which are adjacent to frequency channels used for terrestrial television broadcasts poses a problem in that if the reallocated frequency channels are allocated for use in mobile communications systems, the transmission of mobile radio communication signals on the reallocated frequency channels may interfere with the reception of television content broadcast on the adjacent frequency channels used for terrestrial television broadcasts.

The broadcasting of terrestrial television signals typically involves dividing a geographical area into a number of television regions. Each television region is served by a television signal transmitter that transmits a number of television content streams on a number of different frequency channels. The allocation of television content streams to a given frequency channel is defined in each television region in accordance with a so-called channel map and the channel map used varies between transmitters. In accordance with the present invention it has been recognised that this variation can be exploited by enabling mobile communication base stations to selectively adapt the transmission of mobile radio communication signals based on the channel map of a particular television region. This selective adaptation means that rather than completely suppressing interfering mobile radio communication signals across an entire network or simply tolerating any interference that arises, the otherwise unrelated information associated with channel maps can be used to selectively limit the transmission of the mobile radio communication signals such that interference is reduced whilst maintaining the transmission of the mobile radio communication signals where possible.

In accordance with one example of the present invention, the radio communication signals are transmitted from the base station to the one or more mobile devices via a downlink frequency channel and transmitted from the one or more mobile devices to the base station via an uplink frequency channel, the uplink frequency channel and the downlink frequency channel being divided into frequency sub-channels. The step of adapting the transmission of the radio communication signals comprises selectively limiting or blocking one or more of the frequency sub-channels of the uplink frequency channel and/or the downlink frequency channel.

In this example, the transmission of the radio communication signals is readily and conveniently adapted by selectively limiting or blocking certain uplink and downlink frequency sub-channels used when data is transmitted between the base station and mobile devices.

In accordance with another example of the present invention, identifying the channel map comprises identifying the channel map from data manually entered into a data store connected to the base station. In this example, location information can be conveniently provided to the base station, for example when the base station is installed.

In accordance with another example of the invention, identifying the channel map comprises identifying a location of the base station, determining from the location of the base station a television region in which the base station is located, and identifying the channel map associated with the television region. In accordance with this example, there is no requirement to manually enter the channel map, instead a location of the base station is referenced with respect to a list of television regions for which a list of channel maps is provided. In accordance with this example, each base station need only be provided with a single look-up table containing all the relevant channel maps.

In accordance with a further example of the present invention, identifying the location of the base station comprises receiving location information from a positioning unit connected to the base station or from one of the plurality of mobile devices.

In accordance with another example of the invention, information corresponding to which of the frequency sub-channels have been selectively limited or blocked is transmitted to a second base station, wherein the second base station communicates data with a plurality of mobile devices via radio communication signals in accordance with the adapted communication scheme. In accordance with this example, a first base station, for example a LTE macrocell base station can determine an appropriate adaptation to the transmission of radio communication signals on the frequency sub-channels which reduces interference to the reception of the television content. Information corresponding to this adaptation can then be sent to another base station such as a femtocell base station operating near the other base station. This allows the second base station (e.g. the femtocell base station) to transmit radio communication signals with a reduced likelihood of producing interference without there being a need to undertake any determination of how the transmission of the radio communication signals should be adapted.

In accordance with another aspect of the present invention, there is provided a base station for transmitting data to and receiving data from one or more mobile devices via radio communication signals. The base station is operable to receive a channel map which defines on which of a plurality of frequency channels a plurality of streams of television content are transmitted and the base station is operable to adapt the transmission of the radio communication signals from the base station to the one or more mobile devices and to control the one or more mobile devices to adapt a transmission of the radio communication signals transmitted from the one or more mobile devices in accordance with the received channel map to reduce interference to the reception of the streams of television content received at a television receiver in a vicinity of the base station and the one or more mobile devices.

In accordance with another example of the invention, there is provided a network comprising a plurality of base stations as described above.

Various further aspects and features of the present invention are defined in the claims.

BRIEF DESCRIPTION OF DRAWINGS

Embodiments of the present invention will now be described with reference to the accompanying drawings where like parts bear the same numerical reference and in which:

FIG. 1 shows a table of frequency channels which are currently allocated in the UK for the broadcast of terrestrial television signals;

DETAILED DESCRIPTION

FIG. 1 shows a table of frequency channels which are currently allocated in the UK for the broadcast of terrestrial television signals. As discussed above, after 2012 channels 61 to 68 are to be reallocated to other uses which may include mobile communication services such as the proposed Long Term Evolution (LTE) fourth generation mobile communication system. The remaining channels, i.e. channels 39 to 60, are expected to remain reserved for television broadcast. However, due to the fact that the frequencies associated with channels 53 to 60 are adjacent in the frequency spectrum to the frequencies associated with channels 61 to 68, it is possible that use of channels 61 to 68 for LTE communications will interfere with the reception of television content broadcast on channels 53 to 60. This is explained further with reference to FIG. 2.

Figure 2:
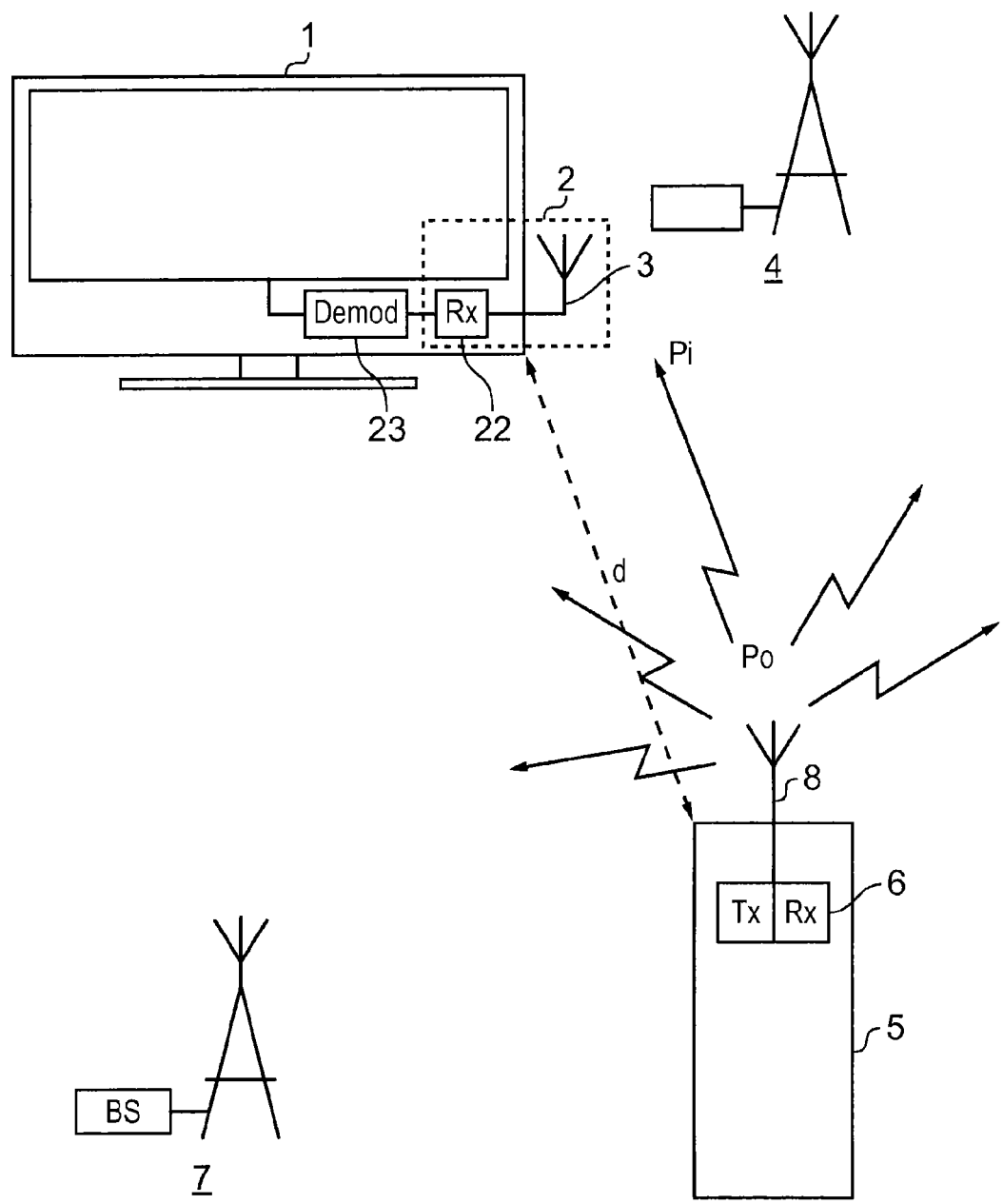
FIG. 2 shows a schematic diagram providing a representation of a conventional television situated near a mobile device and a base station.

FIG. 2 shows a schematic diagram illustrating various parts of a conventional television 1, which includes a receiver 2. For clarity, various parts of the television have been omitted such as amplifier stages and so on but these parts are known in the art. The receiver 2 includes an antenna 3 that intercepts radio signals broadcast from a television transmitter 4 and a tuner 22 which is arranged to filter out all signals apart from those associated with a frequency channel to be received by the television 1. For example, with reference to FIG. 1, if the television 1 was tuned to receive content broadcast on channel 60, the tuner 22 would be tuned to receive radio signals with a centre frequency of 786 MHz. After the received television signal has been filtered by the tuner 22, a demodulator 23 demodulates the selected signal and converts it typically into audio/video information that can be reproduced by the television 1 as sound and pictures.

A mobile device 5 situated near the television 1 includes a transmitter/receiver unit 6 which receives and transmits radio communication signals to and from a base station 7 via an antenna 8.

If the frequency band on which the mobile device 5 is transmitting the radio communication signals is sufficiently close to the frequency band that the tuner 22 in the receiver 2 is tuned to receive (for example channel 61 with a centre frequency of 794 MHz), the radio signals from the mobile device 5 may not be filtered out by the tuner 22 and may interfere with the signals to be demodulated by the demodulator 23. This may arise because television receivers are typically very sensitive so as to be able to receive signals broadcast from transmitters that are up to several tens of kilometers away. Therefore, radio signals transmitted from the mobile device in the vicinity of the television may penetrate the television itself, thus "bypassing" the tuner 22, and even perhaps entering the demodulator 23 directly. In some examples interference might be expected to occur if the mobile device or base station is up to 3 to 10 meters from the television receiver. However, the extent of the interference will also depend on factors including how close to the frequency band the mobile device and base station are transmitting with respect to the frequency band that the television receiver is receiving and the extent of any filtering and screening within the TV and tuner.

Interference with the signals to be demodulated by the demodulator 23 will result in a reduction in the quality of the sound and picture reproduced by the television 1.

LTE Mobile Communications

Figures 3A, 3B:
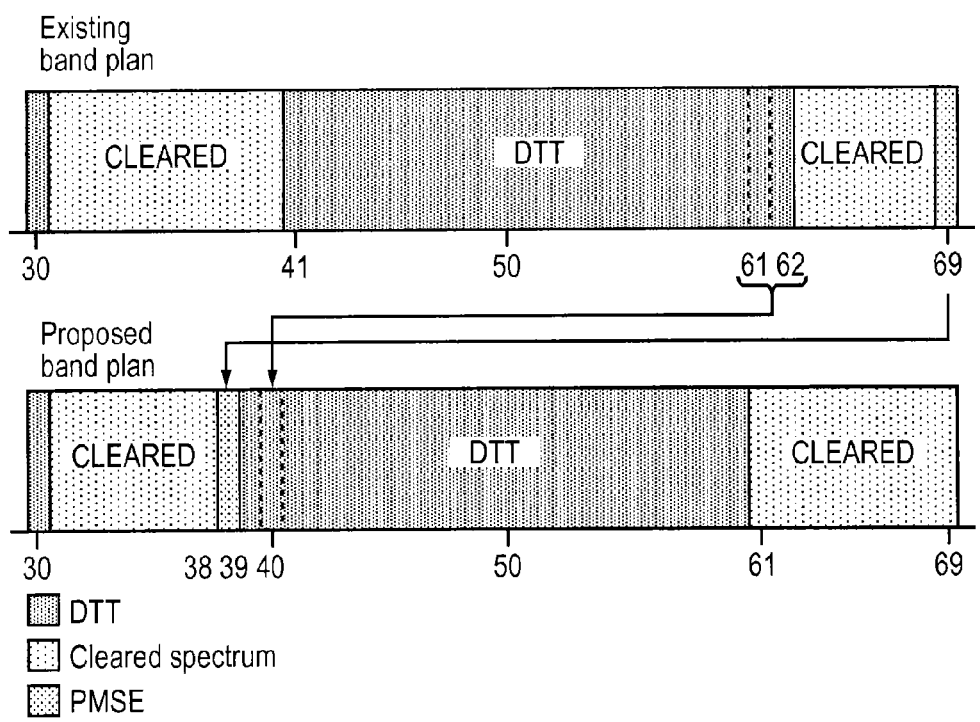
FIG. 3a shows a schematic diagram illustrating a first and second version of a potential allocation of the frequency spectrum in the 790 to 862 MHz frequency band.
FIG. 3b shows a schematic diagram illustrating a possible implementation of a UHF frequency band which could be used by a base station and plurality of mobile devices.

FIG. 3a shows a schematic diagram illustrating a first and second version of a potential allocation of the frequency spectrum in the 790 to 862 MHz frequency band. In 2009 the UK regulatory body OFCOM proposed to widen an originally planned cleared upper frequency band (the so called "Digital Dividend") which will become available after digital switchover is completed in 2012/2013. This will allow the UK to align itself to a proposed pan-European band of 790-862 MHz which can be used for mobile broadband and other services after digital switchover.

Specifically, FIG. 3a shows the 2009 OFCOM proposal to move PMSE (Programme making & Special Events) from channel 69 down to 38 and the plan to re-locate channels 61 and 62 to lower frequency channels such as 39 and 40. Additionally, PMSE access to TV bands 61-68 on an interleaved basis will no longer be permitted by end 2012/early 2013.

FIG. 3b provides a schematic diagram illustrating a possible implementation of the LTE UHF frequency band which could be used by LTE base stations and mobile devices such as the mobile device and base station shown in FIG. 2.

The frequencies between 790 and 791 MHz provide a 1 MHz guard band 301. The frequencies between 791 to 821 MHz are allocated for downlink data transmission (i.e. transmission of data from an LTE base station to LTE mobile devices) and define a downlink spectrum 302. The downlink spectrum 302 is divided into six blocks (i.e. frequency sub-channels) of 5 MHz width. A duplex gap 303 of 11 MHz is provided between the frequencies of 821 to 832 MHz. The frequencies between 832 MHz to 862 MHz are allocated for uplink data transmission (i.e. transmission of data from LTE mobile devices to the LTE base station) and define an uplink spectrum 304. Like the downlink spectrum 302, the uplink spectrum is also divided into six blocks (i.e. frequency sub-channels) of 5 MHz width. Mobile communication systems, such as LTE, are designed so that components such as the base station can adapt the frequency band in various ways. This can include limiting or completely suppressing the transmission of the radio communication signals on individual blocks of the uplink and downlink spectrum and varying the width of the blocks.

Should the LTE UHF frequency band shown in FIG. 3b be implemented without any adaptation, it has been identified that television content broadcast on frequency channels 53 to 60 shown in FIG. 1 would be at risk from interference from LTE devices and frequency channels 58 to 60 would be at a particular risk.

Figure 4:
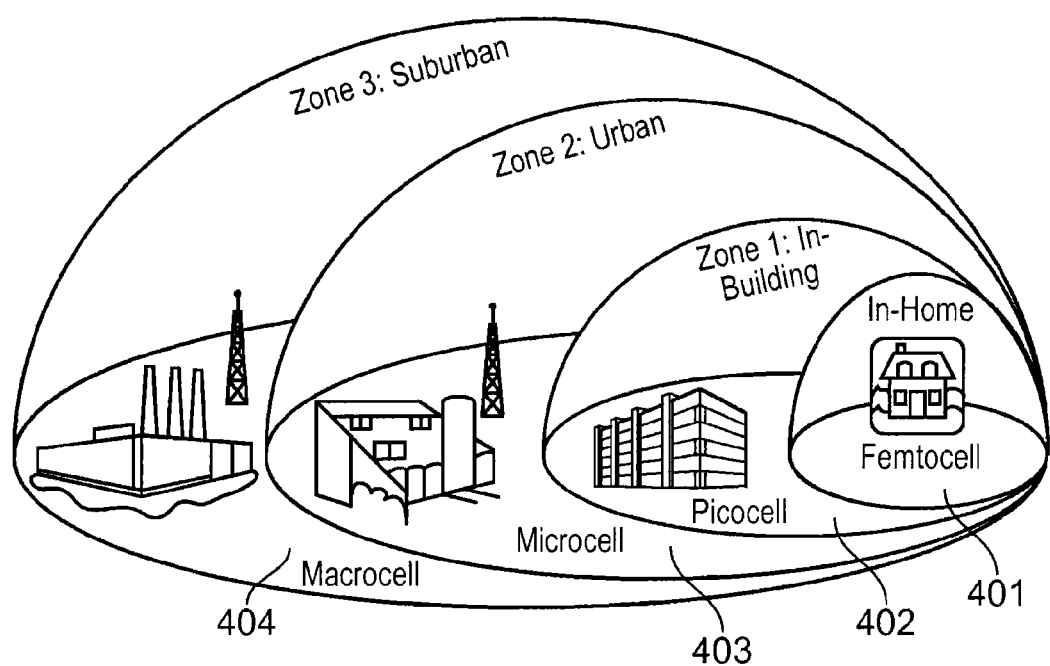
FIG. 4 shows a schematic diagram illustrating the cellular structure of a typical LTE mobile communication network.

FIG. 4 provides a schematic diagram illustrating some of the different types of cells that can be employed in a typical LTE mobile communication network. As with conventional mobile communication networks, a geographical area is divided into a number of different cells which are served by a base station. Data is transmitted between the base station and the mobile devices via radio communication signals transmitted for example, in accordance with the communication scheme illustrated in FIG. 3b. LTE networks may include cells of different sizes, some of which exist within other larger cells. For example as shown in FIG. 4, a "femtocell" 401 provides short range coverage which may be suitable to provide network coverage within a house; a "picocell" 402 may provide network coverage within a large building such as an office block or apartment block, a "microcell" 403 may provide network coverage within a small urban area covering an area from the base station of a few hundred meters and a "macrocell" 404 may provide network coverage to a larger suburban area covering an area from the base station of up to a few kilometers.

Television Regions

Figure 5:
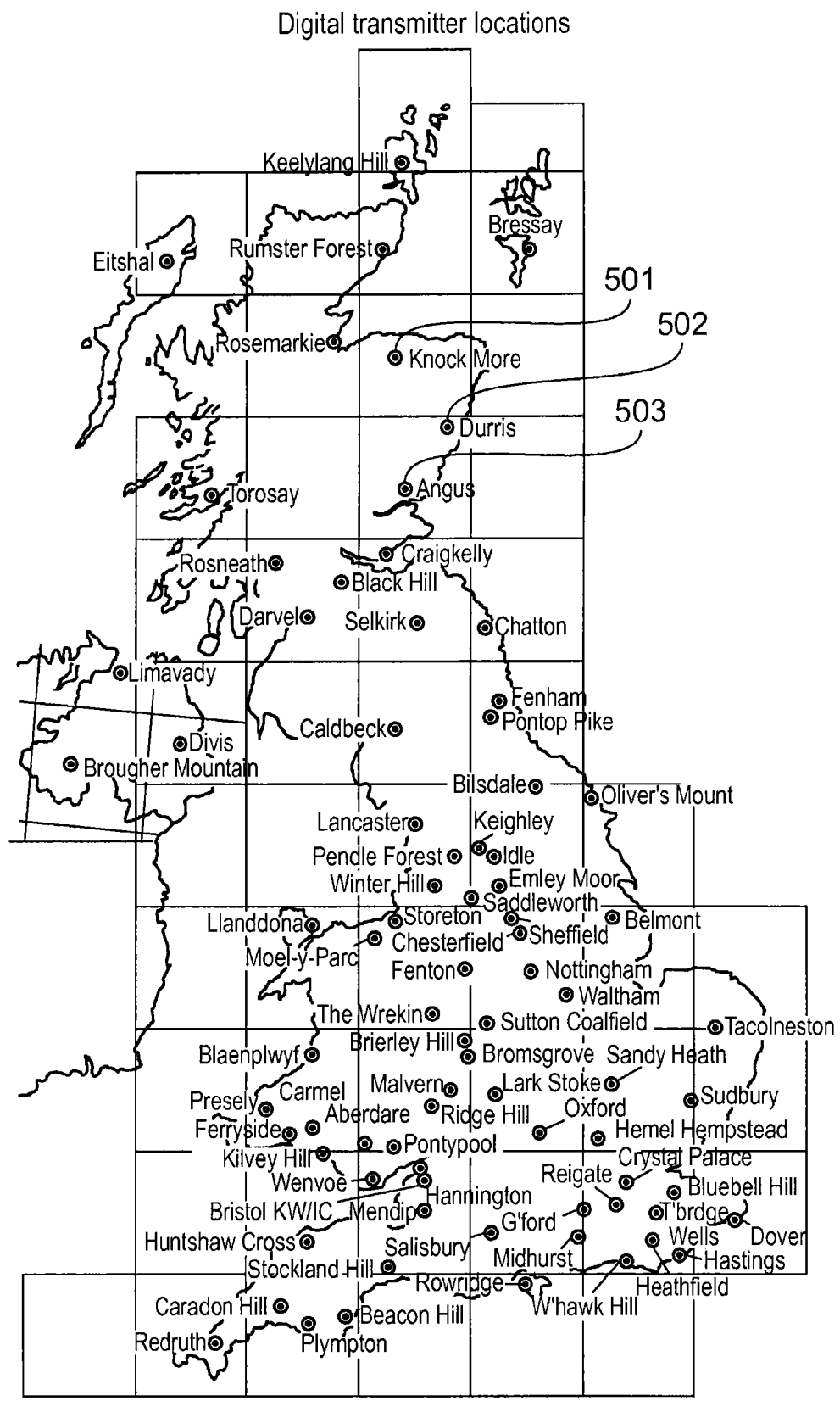
FIG. 5 shows a map illustrating the distribution of digital television transmitters throughout the UK.

Countries such as the UK are divided into different television broadcast regions. Each television region is typically served by a single television transmitter which broadcasts streams of television content on various frequency channels (i.e. the frequency channels shown in the table of FIG. 1). FIG. 5 provides a map illustrating the distribution of digital television transmitters throughout the UK.

For conventional analogue television transmission, a different audio/video stream is broadcast on each frequency channel. These different audio/video streams are referred to as "television channels". Examples in the UK include "BBC 1", "BBC 2" and "Channel 4". However, for digital television transmissions (such as those using the DVB-T transmission scheme) a "multiplex" of content is broadcast on each frequency channel which can include multiple audio/video streams along with other content such as interactive services, content from the Internet such as web pages and so on. So for example in the UK, both "BBC 1" and "BBC 2" may be broadcast on the same frequency as part of a single multiplex. For simplicity, the content broadcast on each frequency channel is referred to as a "television content stream". A television content streams is also known as "service" when referring to digital television signals transmitted in accordance with the DVB family of standards such as DVB-T.

The allocation of each television content stream for transmission on one of the frequency channels depends on a so-called "channel map". The channel map is defined by network planners and maps each frequency channel to a television content stream. For example, with reference to FIG. 1, a first television content stream may be transmitted on channel 39 (with a centre frequency of 618 MHz) and a second television content stream may be transmitted on channel 40 (with a centre frequency of 626 MHz).

Typically adjacent television transmitters (and thus television regions) are arranged to use a different channel map so that the same television content stream is broadcast on different parts of the frequency spectrum in adjacent television regions. This is to avoid interference issues at the boundaries between television regions.

For example, as can be seen from FIG. 5, the television transmitter at Knock More 501 is adjacent to the transmitters at Durris 502 and Angus 503. Accordingly, in a simplified example, television content streams transmitted from these transmitters could include a first television content stream (M1), a second television content stream (M2), a third television content stream (M3), a fourth television content stream (M4), a fifth television content stream (M5), a sixth television content stream (M6) and a seventh television content stream (M7).

In this example, the channel map for the Knock More transmitter 501, the Durris transmitter 502 and the Angus transmitter 503 could be arranged as set out in Table 1 below:

TABLE 1

| Television content | Frequency channel from Knock More | Frequency channel from Durris | Frequency channel from Angus |
|---|---|---|---|
| M1 | 60 | 53 | 43 |
| M2 | 59 | 39 | 44 |
| M3 | 58 | 40 | 45 |
| M4 | 51 | 41 | 46 |
| M5 | 50 | 42 | 47 |
| M6 | 49 | 43 | 48 |
| M7 | 48 | 44 | 49 |

As can be seen by comparing Table 1 with the table shown in FIG. 1, from the Knock More transmitter 501 three television content streams are broadcast on frequency channels that are at risk of being affected by LTE transmissions transmitted using the scheme indicated in FIG. 3b, namely M1 on channel 60 (786 MHz), M2 on channel 59 (778 MHz) and M3 on channel 58 (770 MHz). From the Durris transmitter 502 one television content stream is broadcast on a frequency channel that is at risk of being affected by LTE transmissions, namely M1 on channel 53 (730 MHz). From the Angus transmitter 503 there are no television content streams broadcast on frequency channels at risk of LTE interference.

As Table 1 shows, the effect of LTE transmissions will vary from television region to television region. Specifically, television receivers located in television regions provided by the Knock More and Durris transmitter will potentially experience interference if a LTE mobile device and/or base station is situated in the vicinity of the television receiver. On the other hand television receivers located in the television region provided by the Angus transmitter will not be affected because there are no television channel streams broadcast on at-risk frequency channels.

As will be explained below, this variation can be exploited to optimise systems which aim to reduce the interference caused by the transmission of LTE radio communication signals.

LTE Mobile Communication Network

Figure 6:
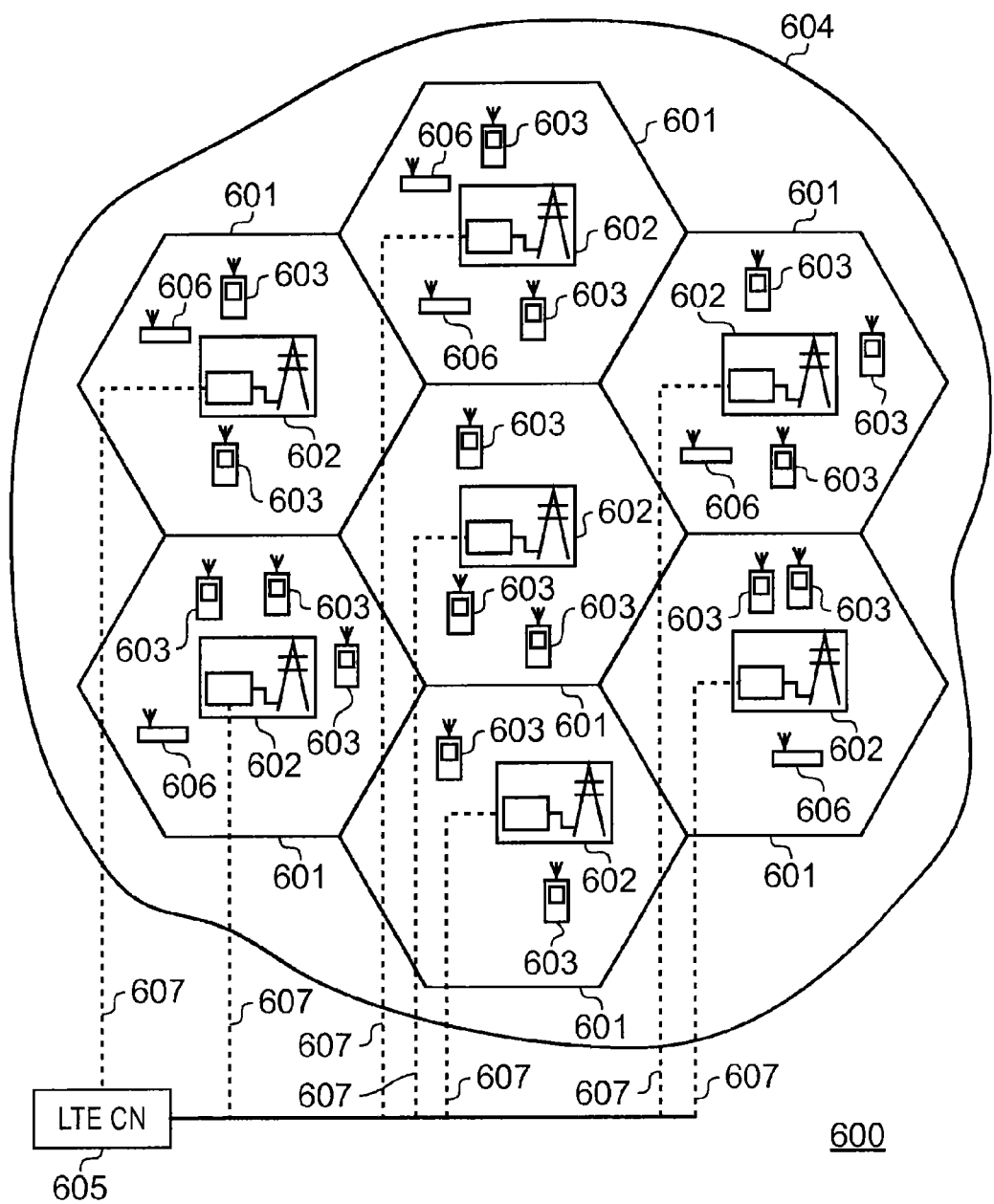
FIG. 6 shows a schematic diagram illustrating part of a LTE mobile communication network.

FIG. 6 shows a schematic diagram illustrating part of an LTE mobile communication network. In this example, the LTE mobile communication network comprises a plurality of macrocells 601 which each include a LTE base station 602 which communicates data to and from a number of LTE mobile devices 603 via radio communication signals. Each LTE base station 602 is connected to the LTE core network 605 via a link 607. The core network 605 provides centralised network functionality such as communicating data between base stations, tracking the mobility of mobile devices, providing access control and so on. The LTE base stations generally control how the mobile devices communicate data. For example, they can control the uplink and downlink frequencies (i.e. the frequency channel on which data is transmitted from the base station to the mobile devices and the frequency channel on which data is transmitted from the mobile devices to the base station). Moreover, the base stations are typically operable to control the exact frequency sub-channel within the uplink channel on which the mobile devices transmit data.

The plurality of macrocells 601 shown in FIG. 6 are located within a television region 604 (for example a geographical area covered by one of the transmitters discussed in relation to FIG. 5). As will be understood, the entire LTE mobile communication network is likely to be spread over several television regions. In any case, television receivers situated within the television region 604 and in the vicinity of one or more of the base stations and/or mobile devices will potentially experience interference in the reception of television content streams on at-risk frequency channels.

As mentioned above, the LTE communication network may also include a number of smaller cells such as microcells, femtocells or picocells. These cells are provided by a plurality of pico/micro/femto base stations 606. As will be understood from FIG. 5, a macrocell with a typical radius from the base station of 1 to 5 kilometers is significantly smaller than a typical television region which may have a radius from the television transmitter of several tens of kilometers.

Manual Programming of Macrocell Base station

Figure 7:
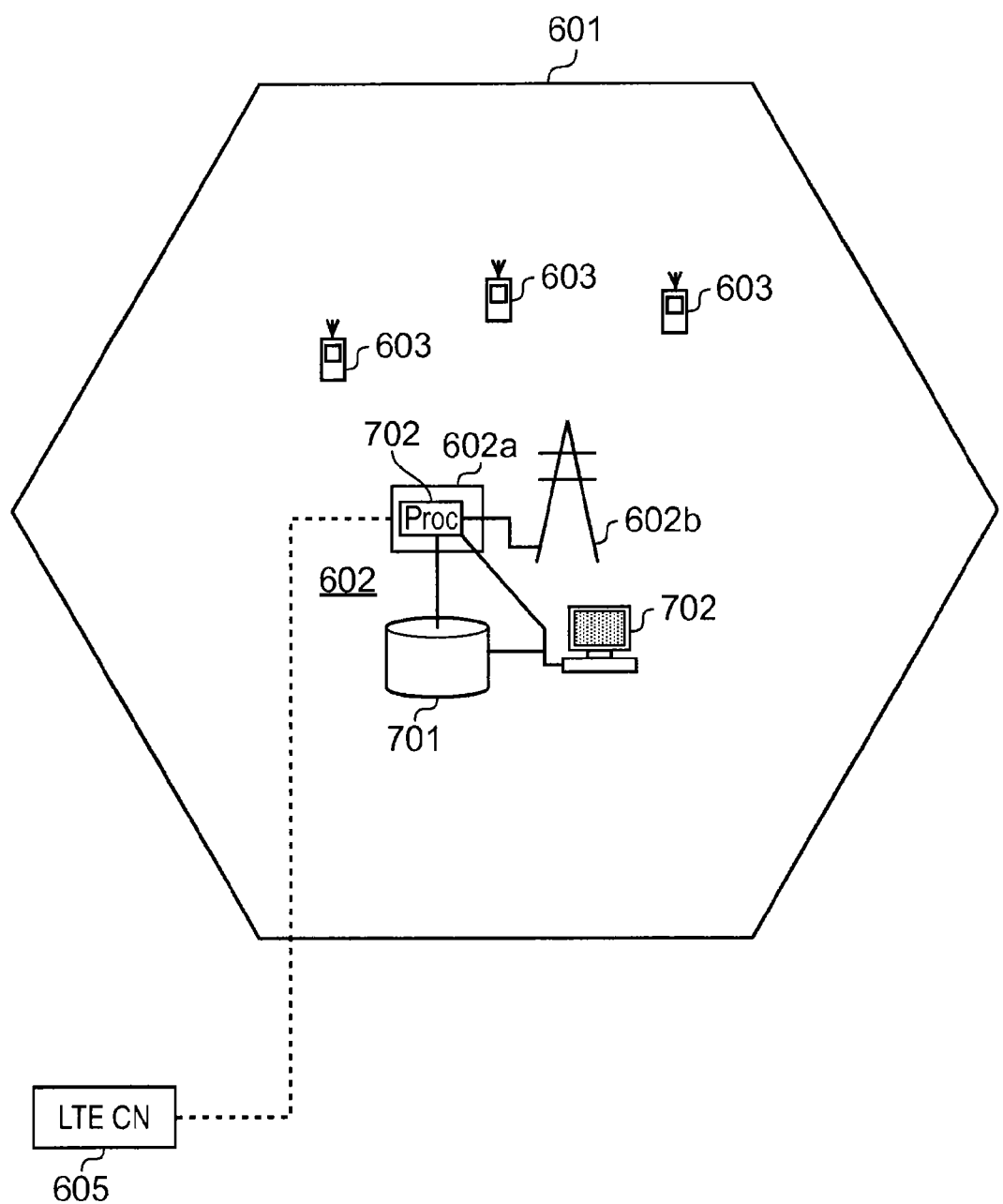
FIG. 7 shows a schematic diagram providing an illustration of a macrocell arranged in accordance with an example of the present invention.

FIG. 7 shows a schematic diagram providing a more detailed illustration of one of the macrocells shown in FIG. 6. The macrocell shown in FIG. 7 is arranged in accordance with an example of the invention. The macrocell base station 602 includes an antenna 602b for transmitting and receiving radio signals from the mobile devices 603 and a base station controller 602a for controlling the transmission of data to and from the mobile devices 603. Data is transmitted between the base station 602 and the mobile devices 603 in accordance with the LTE UHF frequency band shown in FIG. 3b. The base station controller 602a includes a processor 702 which can adapt how the LTE frequency band is used by generating an adapted LTE frequency band. For example, the processor can be arranged to either limit or completely suppress the transmission of radio communication signals on certain blocks in the uplink or downlink spectrum. Alternately or additionally, the strength of radio communication signals broadcast on various blocks could be limited. Further still, the period of time during which radio communication signals are transmitted on certain blocks could be limited. Further still the frequency width of certain blocks could be reduced.

This adaptation of the LTE frequency band can be performed in dependence on the channel map of the television region 604 within which the macrocell 601 is situated to reduce interference with television content broadcast on the at-risk channels in that particular television region. Examples of this are explained further below.

In one example the base station controller 602a is connected to a data store 701 which includes a look-up table that includes details of the channel map for the television region 604 within which the macrocell is located. The look-up table can be manually programmed when the base station 602 is installed, for example via a terminal 702. Depending on the channel map stored in the look-up table, the processor 702 can then be arranged to adapt the transmission of data to and from the mobile devices 603 to ensure that any interference caused by LTE transmission is reduced by adapting the LTE frequency band as described above.

For example, in the simplified example explained with reference to FIG. 5, assuming that the television region is provided by television signals from the Angus television transmitter, as can be seen from Table 1, none of the television content streams are broadcast on frequency channels which are likely to be affected by interference from LTE transmissions. Accordingly, the look-up table stored in the data store 701 would indicate that there is no television content being broadcast on an at risk channels therefore the base station 602 is free to permit the transmission of LTE radio communication signals to and from mobile devices on the entire downlink spectrum 302 and the entire uplink spectrum 304 and thus the processor need not adapt the LTE frequency band in any way.

On the other hand, if the television region is provided by television signals from the Knock More television transmitter, as explained above at least three of the television content streams are broadcast on frequency channels that are particularly at risk from interference from LTE radio communication signals. Accordingly, the processor 702, after retrieving the channel map from the look-up table in the data store, may be arranged to limit or completely suppress any LTE transmissions on all blocks of the downlink spectrum 302 and all blocks of the uplink spectrum 304 of LTE frequency band. In this case, the base station could be arranged to allow LTE radio communication signals to be transmitted to and from the mobile devices 603 on alternative sections of the frequency spectrum which have been allocated for LTE transmissions. Alternatively the processor may be operable to block all but the highest frequency blocks from the downlink spectrum 302 and the uplink spectrum 304 and reduce the width of these blocks. Furthermore the processor may be operable to reduce, the blocks from a frequency width of 5 MHz to, for example, a width of 1.4 MHz. Alternately or additionally, the processor could be operable to adapt a maximum strength of the radio communication signals broadcast on various blocks. Further still, the processor could define a reduced period of time during which radio communication signals are transmitted on certain blocks.

In another example, if the television region is provided by television signals from the Durris television transmitter, as explained above, only one of the television content streams is broadcast on a frequency channel which is at risk from LTE transmissions. Moreover, this frequency channel is at the furthest end of the group of channels that are at risk from interference from LTE radio commutation signals. In this case, the processor 702, after retrieving the channel map from the look-up table in the data store, may be arranged to limit or completely suppress downlink transmissions in the lower frequency downlink blocks of the downlink spectrum 302. This could be, for example, the three lowest frequency blocks (i.e. 791 to 796 MHz, 796 to 801 MHz and 801 to 806 MHz).

Location Based Programming of Macrocell Base Station

Figure 8:
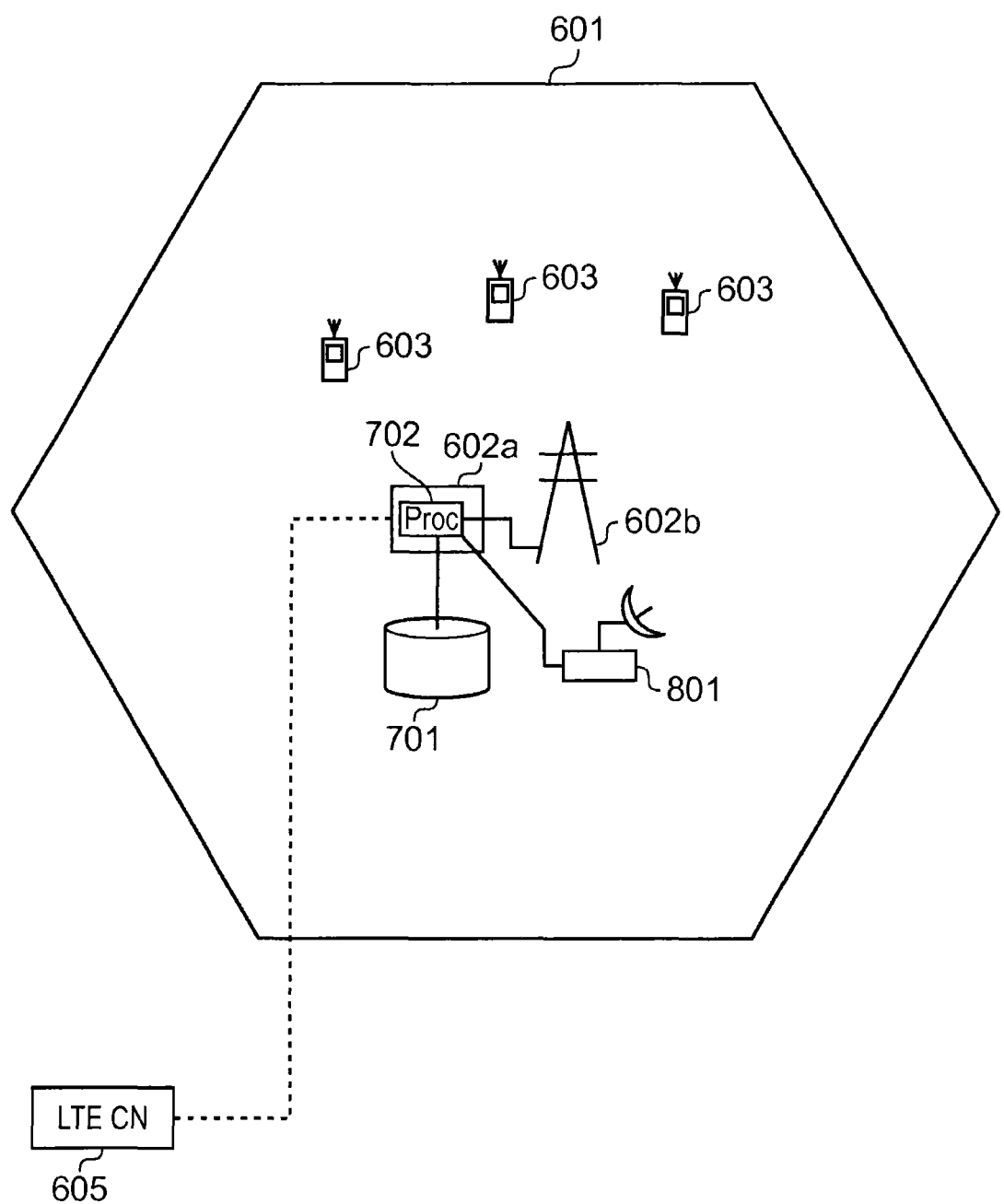
FIG. 8 shows a schematic diagram providing an illustration of a macrocell arranged in accordance with an example of the present invention.

FIG. 8 provides a schematic diagram illustrating an example of a macrocell arranged in accordance with another example of the invention. The macrocell shown in FIG. 8 is the same as that shown in FIG. 7 except that rather than a terminal for manually programming the channel map for the television region 604 within which the macrocell is located, the base station controller 602a is connected to a positioning unit 801 which is arranged to determine the geographical position of the base station 602. The positioning unit 801 can be any suitable means for independently determining the position of the base station 602 such as a global positioning system (GPS) unit or a unit based on the Galileo satellite navigation system. In some examples, to improve sensitivity (for example locations where there is no line of sight to a satellite), assisted GPS (AGPS) could be used.

In this example, the look-up table stored in the data store 701 contains a list of the geographical location of all the relevant television regions along with the channel map associated with each television region. When the positioning unit 801 identifies the position of the base station 602, the base station controller 602a is arranged to access the look-up table stored in the data store 701 to determine which television region the base station is in and the channel map associated with that television region. The processor 702 in the base station controller 602a may then generate the adapted LTE frequency band in dependence on the channel map as described above.

Macrocell Base Station Programming of Femtocell

Figure 9:
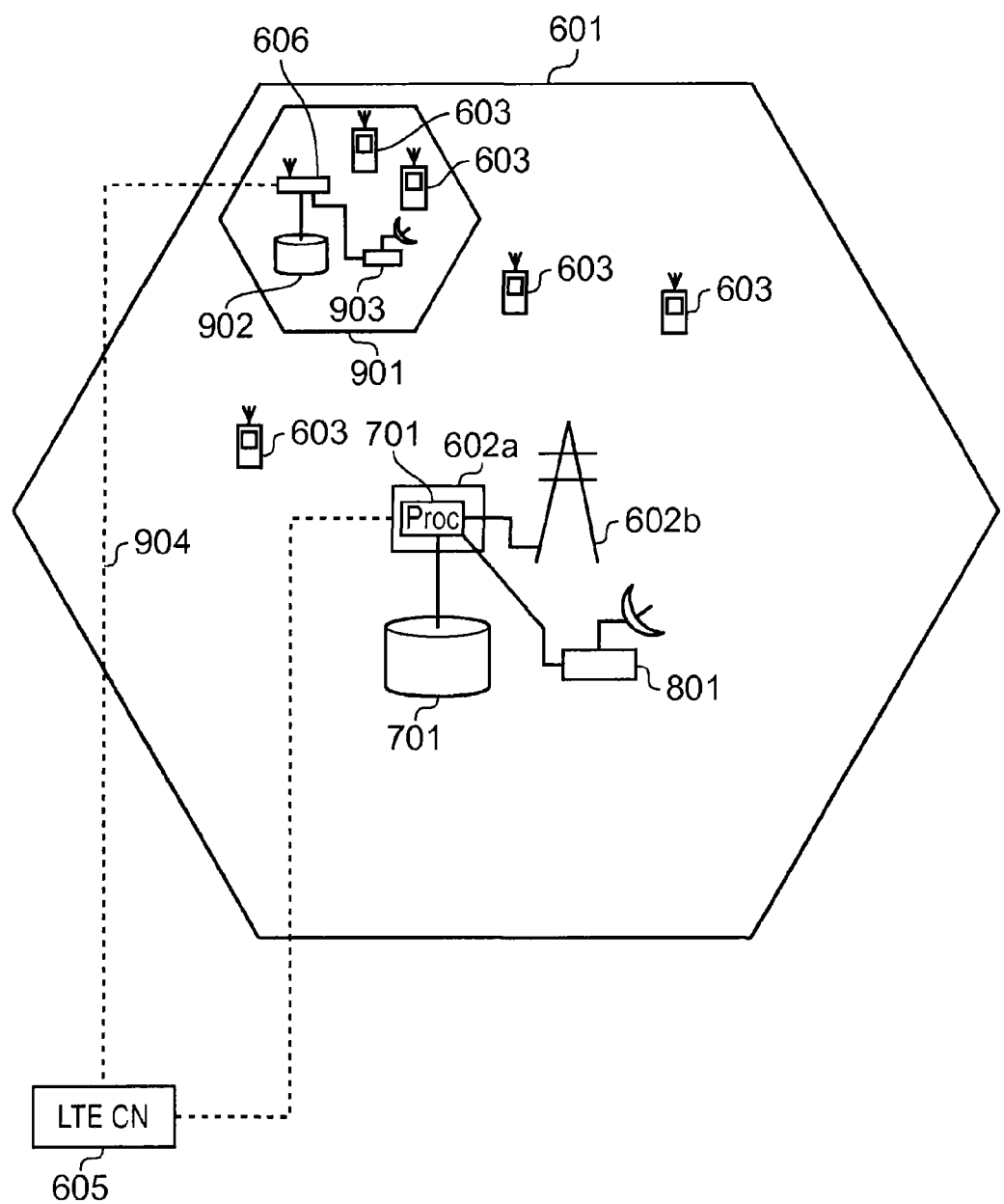
FIG. 9 shows a schematic diagram providing an illustration of a macrocell arranged in accordance with an example of the present invention.

FIG. 9 provides a schematic diagram illustrating an example of a macrocell arranged in accordance with another example of the invention. FIG. 9 shows a femtocell 901 which is provided by a femtocell base station 606. As explained above, the femtocell 901 is effectively a short range LTE cell provided by the femtocell base station 606. The femtocell base station 606 is connected to the LTE core network by a link 904 which is typically provided by a domestic ADSL link. The femtocell is arranged in correspondence with the macrocell 601 in that it includes a data store 902 in which is contained a look-up table of the location of all relevant television regions along with corresponding channel maps, and a positioning unit 903 to determine the location of the femtocell base station 606. When the positioning unit 903 identifies the position of the femtocell base station 606, the femtocell base station 606 is arranged to access the look-up table stored in the data store 902 to determine which television region the femtocell base station 606 is located in and the channel map associated with that television region. The femtocell base station 606 may then adapt the LTE frequency band in dependence on the channel map as described above.

User Defined Location Information

Figure 10:
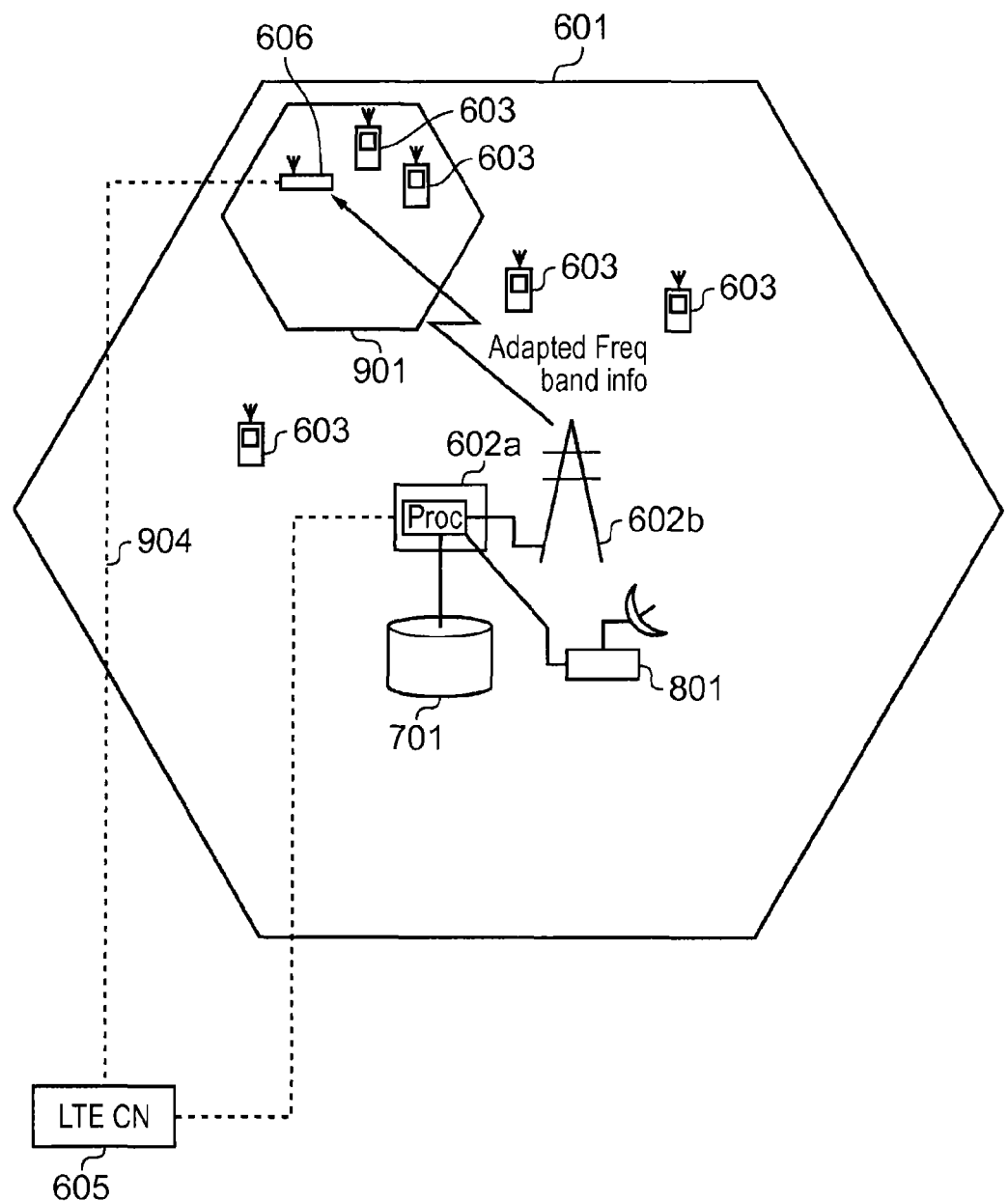
FIG. 10 shows a schematic diagram providing an illustration of a macrocell arranged in accordance with an example of the present invention.

FIG. 10 provides a schematic diagram illustrating an example of a macrocell arranged in accordance with another example of the invention. In some situations it may be impractical or undesirable to require that the femtocell 606 includes its own data store providing the look-up table of the various channel maps. Accordingly, in the example shown in FIG. 10, the macrocell base station controller 602a is arranged to determine the adapted. LTE frequency band as described above. FIG. 10 shows the positioning unit 801 which determines the relevant channel map by identifying the location of the base station. However, it will be appreciated that in this example the channel map could be provided by manually inputting it to the base station as explained with reference to FIG. 7.

In any case, once the macrocell base station 602 has generated an adapted LTE frequency band in accordance with the identified channel map as described above, the macrocell base station 602 transmits LTE frequency band adaptation information to the femtocell base station 606. The femtocell base station 606 is then arranged to adapt the LTE frequency band accordingly. In some LTE mobile communication networks, femtocell base stations are arranged to communicate with the macrocell base stations in order to avoid adjacent base station interference issues. Thus, a communication channel already exists which will permit a femtocell to manage the bandwidth of either or both of the LTE uplink or downlink channel bandwidths.

As will be understood, the technique illustrated in FIG. 10 can be applied to any LTE base station situated within the cell of another LTE base station. For example a macrocell base station could communicate the LTE frequency band adaptation information to any of a femtocell, picocell or microcell base station, a microcell base station could communicate LTE frequency band adaptation information to a femtocell or a picocell base station, and so on.

Location Input by User to Femtocell

Figure 11:
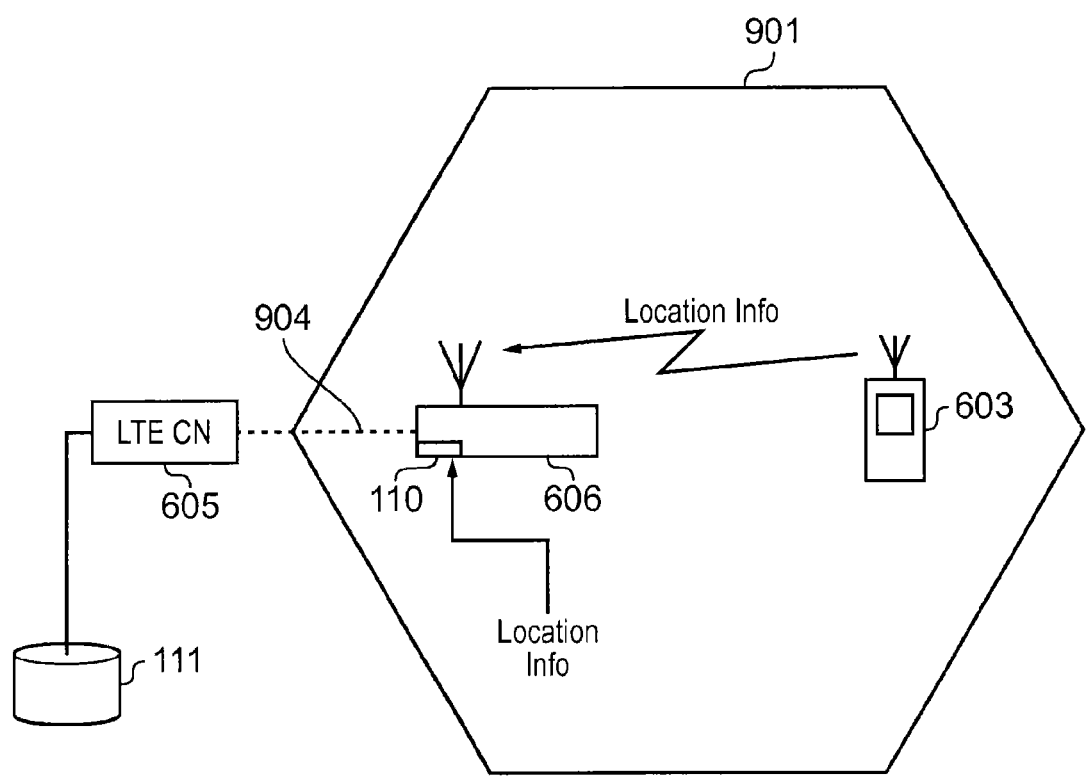
FIG. 11 shows a schematic diagram illustrating a femtocell arranged in accordance with an example of the present invention.

FIG. 11 provides a schematic diagram illustrating a femtocell arranged in accordance with another example of the present invention.

LTE femtocell base stations are typically intended to be installed by a user in a home environment by connecting the femtocell base station 606 to the LTE core network via a communication link such as an ADSL line. The femtocell 901 is then established in the user's home providing LTE network coverage. As before, it is desirable to provide the femtocell base station with an adapted LTE frequency band in order to reduce a likelihood of interfering with television content streams being broadcast on at-risk channel frequencies.

In order to reduce the complexity of femtocell base station 606, rather than providing it with a data storage unit including a look-up table, means can be provided which enable the user to send location information from the femtocell base station 606 back to the LTE core network 605 via the link 904. This location information is then received at the LTE core network 605 which determines the television region within which the femtocell is located based on the location information by identifying the frequency channel plan associated with that television region from information stored in a data store 111. An appropriate adapted LTE frequency band can then be determined and transmitted back to the femtocell base station 606. The femtocell base station then implements the adapted LTE frequency band.

In some examples the location information can be an area code such as a UK "post code" (typically a seven letter alpha-numeric code that uniquely identifies a geographical regions in the UK). In other examples, the location information could be specific postal address information identifying a street or building in which the femtocell is located. In further examples the information could be longitude and latitude derived manually by the user from a map or from a positioning system.

In some examples the user can input the location information directly via an interface 110 on the femtocell base station. In other examples, when the user installs the femtocell base station, they may send a text message (such as a short message service (SMS) message) including the location information from the mobile device 603 to the femtocell base station 606. The femtocell base station 606 then sends the text message including the location information to the LTE core network as described above. In order to encourage the user to enter the location information, in some examples the femtocell base station 606 can be arranged to provide reduced functionality until the location information is provided.

In some examples specific channel map information can be provided by a "teletext" service (i.e. a text based information service which is included in a content stream broadcast in a particular television region). The teletext service may be provided by a MHEG (Multimedia and Hypermedia Experts Group) application or a Java application. In one example a user may access a specific teletext page to access channel map information or a coded representation of the channel map. In some examples this page may include a specific code to send by a text message as discussed above. In some examples, at each television transmitter there may be local insertion of a transmitter-specific teletext page with information representing the channel map. (teletext=data service, could be an MHEG or Java application)

In Line Filter on Television Receiver

Figure 12:
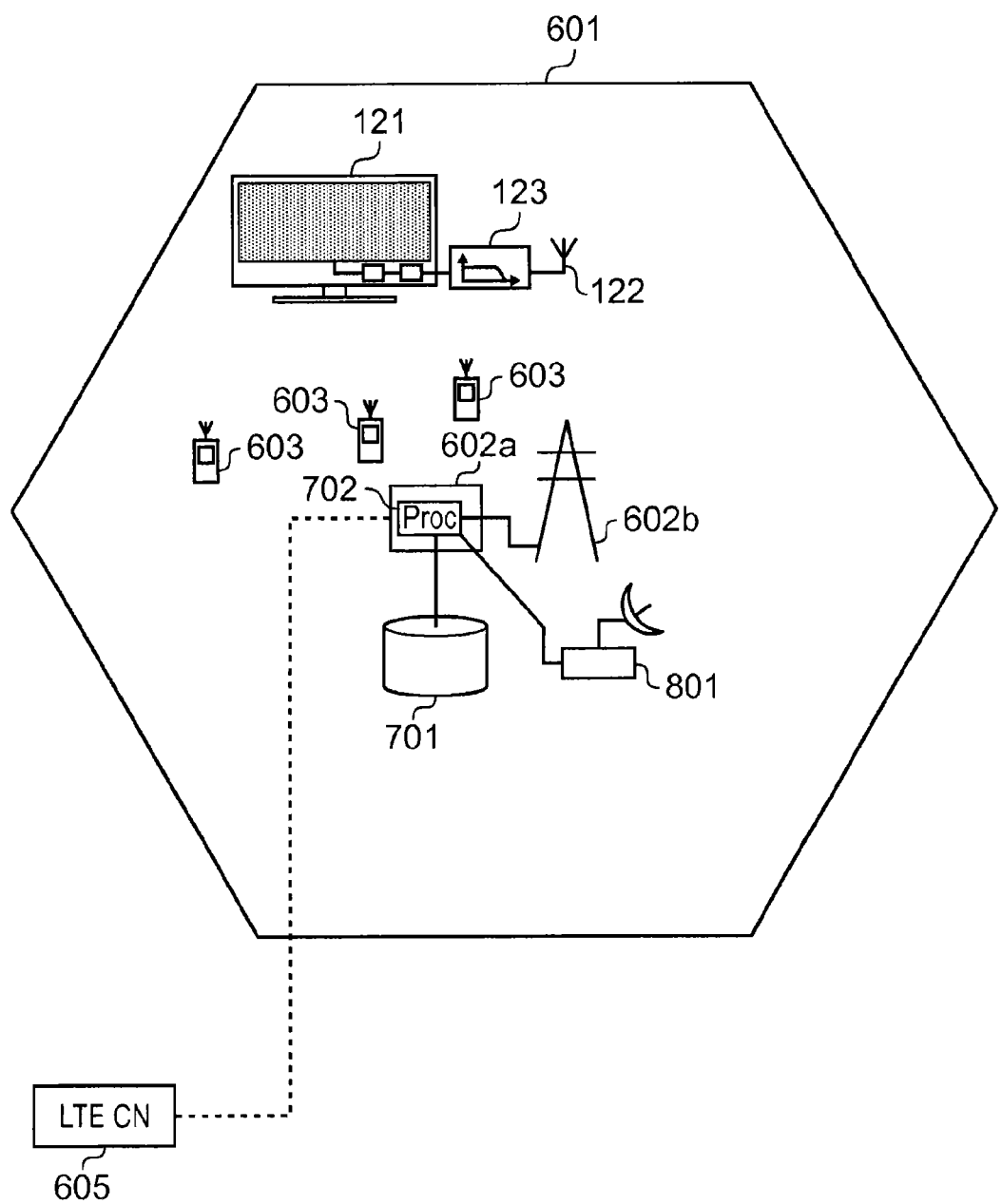
FIG. 12 shows a schematic diagram illustrating a macrocell and a television receiver arranged in accordance with an example of the present invention, and FIG. 13 provides a flow diagram indicating steps of a method according to an example of the present invention.

FIG. 12 provides a schematic diagram illustrating another example of the invention. In order to further reduce any interference experienced at a television receiver due to the transmission of LTE radio communication signals transmitted to and from the macrocell base station 602 and the plurality of mobile devices, a television receiver such as a television 121 can be fitted with an inline filter 123 on an aerial 122. In one example the inline filter 123 comprises a band pass filter arranged to filter frequency bands on which the LTE radio communication signals are being transmitted. With reference to FIGS. 1 and 3, the inline filter 123 could be arranged to filter frequencies between 794 MHz to 850 MHz (i.e. frequency channels 61 to 68). This arrangement can reduce the extent to which the LTE frequency band need be adapted to reduce the interference caused.

Figure 13:
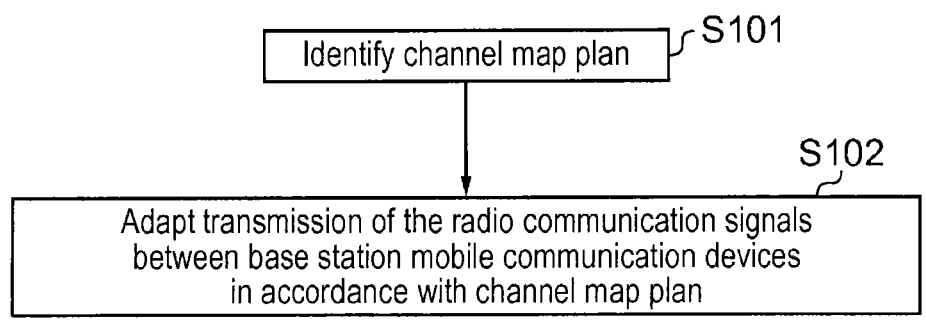

FIG. 13 provides a flow diagram indicating steps of a method according to an example of the present invention. At step S101 a base station identifies the channel map and at step S102 the base station adapts a transmission of radio communication signals to and from mobile devices in accordance with the channel map.

Various modifications can be made to the present invention. For example, the above examples of the invention have been described in terms of LTE communications networks that communicate radio communication signals in accordance with the UHF spectrum shown in FIG. 3b and television content streams which are broadcast on the frequency channels indicated in FIG. 1. This results in a spectrum in which the television content streams are broadcast on a first set of frequency channels and the LTE radio communication signals are broadcast on an adjacent set of frequency channels. However, the concept of identifying a channel map to determine if or how a mobile communication spectrum is arranged could be applied to frequency spectrum allocations which differ from this. For example, the frequency channels on which the television content streams are broadcast could be intermixed with the frequency channels on which the mobile radio communication signals are transmitted.

Furthermore, although the invention has been explained mainly with reference to LTE mobile communication systems, the invention would be equally applicable to other mobile communication systems known in the art such as UMTS, GSM, CDMA2000 and so on.

The invention claimed is:

1. A method of reducing interference to reception of a first radio communications signal received at a first device, the first signal being transmitted on one of a plurality of first frequency channels in accordance with a channel map, the channel map defining for each of a plurality of regions a mapping of each of the plurality of first frequency channels on which the first signal is transmitted, the interference being caused by a base station transmitting data to or receiving data from a second device via second radio communication signals in a vicinity of the first device, the second radio communication signals being transmitted from the base station to the second device via or transmitted from the second device to the base station via second frequency channels divided into frequency sub-channels, the method comprising:

identifying a geographical location of the base station;

determining from the geographical location of the base station a region in which the base station is located by referring to a region map indicating a geographical distribution of regions;

identifying the channel map associated with the region by referring to information indicating the channel map associated with the region; and depending on whether the channel map indicates that at least one of the first frequency channels is adjacent to the second frequency channel, adapting the transmission of the second radio communication signals between the base station and second device in accordance with the identified channel map to reduce interference at the first device by selectively limiting or blocking one or more of the frequency sub-channels of the second frequency channels.

2. The method according to claim 1, wherein the identifying of the channel map comprises identifying the channel map from data manually entered into a data store connected to the base station.

3. The method according to claim 2, wherein the identifying of the location comprises receiving location information from a positioning circuitry connected to the base station.

4. The method according to claim 2, wherein the identifying of the location comprises receiving location information from one of the one or more second devices.

5. The method according to claim 3, wherein the location information is input to one of the one or more second devices by a user and transmitted to the base station as a text message.

6. The method according to claim 1, further comprising transmitting adaptation information indicating which of the frequency sub-channels have been selectively limited and/or blocked and an extent to which the frequency sub-channels have been selectively limited or blocked to a second base station, wherein the second base station communicates data with one or more second devices via radio communication signals in accordance with the selective limiting or blocking of the frequency sub-channels indicated in the adaptation information.

7. The method according to claim 1, wherein selectively limiting or blocking includes determining a period of time over which the one or more frequency sub- channels can carry second radio communication signals.

8. The method according to claim 1, wherein the channel map comprises a table defining the relationship between the frequency channel over which the first radio communications signal is received and the location of the first device.

9. A base station for transmitting data to and receiving data from one or more second devices via second radio communication signals, wherein the base station comprises circuitry configured to:

transmit the second radio communication signals to the one or more second devices via a second frequency channel;

control the one or more second devices to transmit the radio communication signals to the base station via the frequency second channel, the second frequency channel being divided into frequency sub-channels;

identify a geographical location of the base station;

determine from the geographical location of the base station a region in which the base station is located by referring to region map indicating a geographical distribution of regions;

identify a channel map associated with the region by referring to information indicating the channel map associated with the region, the channel map defining for each of a plurality of regions a mapping of a first radio communications signal onto one of a plurality of frequency channels on which the first radio communications signal is transmitted; and depending on whether the channel map indicates that at least one of the frequency channels is adjacent to the second frequency channel, adapt the transmission of the second radio communication signals from the base station to the one or more second devices, and to adapt a transmission of the second radio communication signals transmitted from second mobile devices in accordance with the channel map by selectively limiting or blocking one or more of the frequency sub-channels of the second frequency channel in accordance with the channel map to reduce interference to the reception of the radio communications signal received at a first device in a vicinity of the base station and the one or more mobile devices.

10. The base station according to claim 9, wherein the base station comprises a data store in which is stored data corresponding to the channel map and interface circuitry for enabling the channel map to be manually input to the data store.

11. The base station according to claim 9, wherein the circuitry comprises a positioning circuitry connected to the base station configured to determine a location of the base station.

12. The base station according to claim 9, wherein the bases station comprises interface circuitry enabling a user to manually enter the location information.

13. The base station according to claim 9, configured to transmit adaptation information indicating which of the sub-channels has been selectively limited and/or blocked and an extent to which the sub-channels have been selectively limited and/or blocked to a second base station, enabling the second base station to communicate data with one or more second devices via second radio communication signals in accordance with the adaptation information.

14. The base station according to claim 9, wherein selectively limiting or blocking includes determining a period of time over which the one or more frequency sub- channels can carry second radio communication signals.

15. The base station according to claim 9, wherein the channel map comprises a table defining the relationship between the frequency channel over which the first radio communications signal is received and the location of the first device.

16. A network comprising a plurality of base stations according to claim 9.

17. A method, comprising:

providing channel map comprising information associating a geographical region with a plurality of first frequency channels over which a first radio communications signal is transmitted;

providing an interface for a base station to identify a channel map associated with a geographical region;

the channel map providing information enabling the base station to adapt the transmission of a second radio communications signal with a second device or reception of a second radio communications signal with a second device by selectively limiting or blocking one or more frequency sub-channels of the second frequency channels when the channel map indicates that at least one of the first frequency channels is adjacent to the second frequency channels.

18. The method according to claim 17, wherein the channel map provides information enabling controlling a period of time over which one or more second frequency sub channels can carry a second radio communications signal.

* * * * *